June 6, 1967 G. T. KLEES 3,323,305
ATTENUATING DEVICE

Filed Oct. 16, 1964 2 Sheets-Sheet 1

INVENTOR.
Gerard T. Klees
BY
W. S. Pettigrew
ATTORNEY

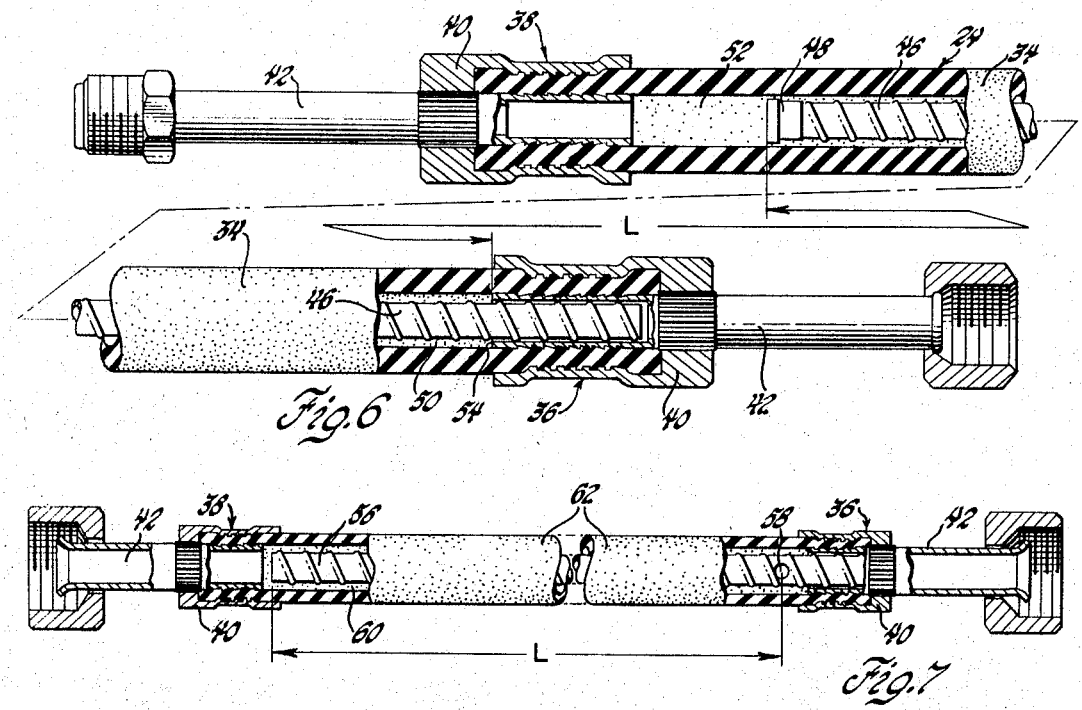
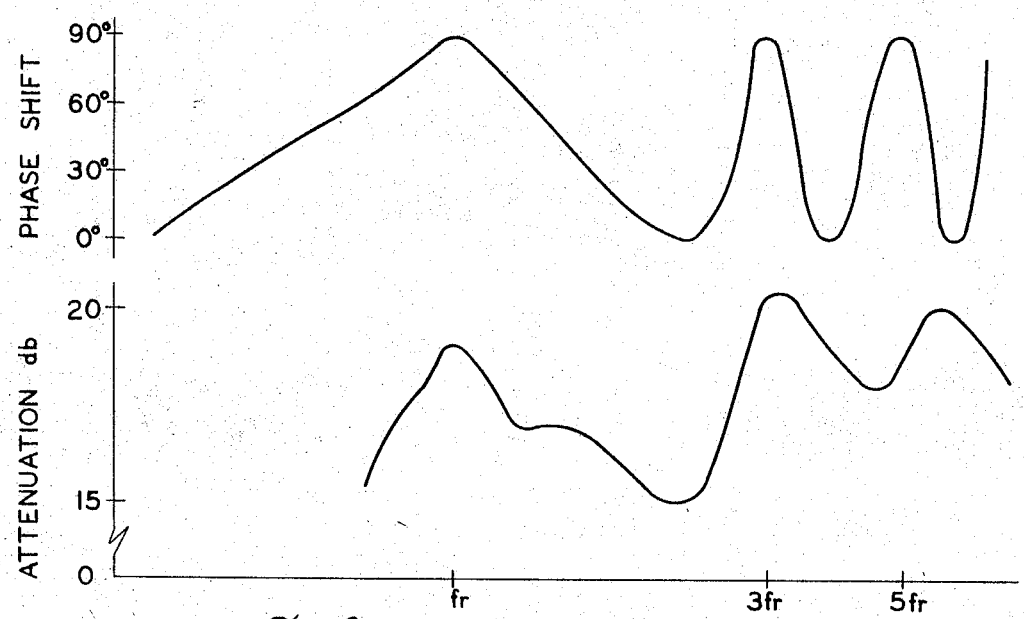

United States Patent Office 3,323,305
Patented June 6, 1967

3,323,305
ATTENUATING DEVICE
Gerard T. Klees, Rochester, Mich., assignor to General Motors Corporation, Detroit, Mich., a corporation of Delaware
Filed Oct. 16, 1964, Ser. No. 404,364
12 Claims. (Cl. 60—52)

ABSTRACT OF THE DISCLOSURE

A fluid wave motion attenuating device of the pressure wave interference type generally includes a main conduit portion and a side branch portion of the distributed acoustical parameter type constructed of radially flexible walls and communicating with the main conduit portion to receive pressure wave motion therein and carry the received wave motion over a tuned length for reintroduction to the main conduit portion substantially one-half wavelength out-of-phase with the incident wave motion therein. The length of side branch portion required for such out-of-phase reintroduction is tuned by length according to a relationship between the radial or transverse flexibility of the side branch conduit walls, the characteristic wave motion propagation velocity of the fluid contained in the device, and the frequency of the wave motion. Specifically, such an attenuating device is employed as a supply conduit and power steering rasp dampener for a power steering system, the device including an elastomeric hose member operative to carry pressurized fluid between points in the power steering system and a flexible tube member arranged coaxially within the hose member, the hose and tubular members defining therebetween a quarterwave side branch portion of a pressure wave interference attenuator adapted to receive incident propagating wave motion from the power steering pump and to carry the received wave motion over a tuned length determined according to the wavelength controlling effects of the elasticity of the hose member.

This invention is mainly concerned with the elimination of objectionable noise or vibration created by certain of the operating components of an automotive vehicle, particularly the so-called rasp associated with a vehicle power steering gear. The invention, however, has application in many specific areas of noise control, and in its broader aspects contemplates a new and improved means for of narrow band attenuation of periodic pressure wave motion transmitted through fluid media in a conduit according to the principles of pressure wave interference such as is used in a quincke filter or quarter-wave side branch tube.

Power steering rasp is the result of the steering column and other associated structure being excited by the periodic pressure pulsations of the power steering pump, and is generally manifested to the vehicle operator as objectionable vibration at the steering wheel, particularly during engine idling conditions. Since, as with other types of vehicle noise, power steering rasp is vibratory in nature and not susceptible to conventional methods of vehicle noise attenuation, such as by the addition of absorptive media in a noise path, and since the rasp problem has never been satisfactorily eliminated by simple vibration isolation, it was felt that it would be most rewarding to attempt to cancel the vibration at its source, i.e., the pump, without, of course, compromising the operation of the steering system. Since, the pump operates at a substantially constant speed or frequency during the most objectionable rasp conditions, it was felt that the principles of the pressure wave interference technique could well be applied to eliminate the problem. According to this technique, the periodic pump pulsations in a main conduit leading from the pump would be communicated to and returned by a tube or side-branch tuned to a length effectively providing a one-half wavelength phase lag at the frequency of interest so as to respond to the pulsations in the main conduit and blend or interfere its own pulsations substantially 180° out-of-phase therewith so that the resultant periodic disturbance in the medium is zero.

Although pressure wave interference devices have been used in the past to cancel periodic motion of fixed frequency in a conduit, their use has been limited since the physical sizes to which they must be tuned, being a direct function of the wavelength of the periodic motion of interest, are excessively large when dealing with any but very high frequencies. By way of example, a power steering pump generating pulsations in medium grade oil at a frequency in the order of 120 cycles per second would require a quarter wave side branch filter tuned to a length of at least 9 feet. It is quite apparent that a device of this physical size cannot be fitted in a power steering system of a modern automobile.

This invention provides a new and improved method for attenuation of periodic motion in a conduit employing the pressure wave interference technique, but embodied in a device of a size greatly reduced from that of prior attenuators. This method utilizes the principle that the propagation rate and wavelength of a periodic disturbance in a fluid media contained within a conduit is directly dependent on the rigidity of the walls of the conduit. Specifically, as the wall material is lessened in rigidity, the propagation rate is slowed, and the wavelength reduced. Thus, if it is desired to employ the pressure wave interference technique to effect cancellation of a periodic pressure wave, the physical length to which the side-branch or tube must be tuned to effectively provide a half wavelength phase lag path for the periodic motion can be directly controlled by correct selection of the conduit wall material.

The primary object of this invention is to provide a new and improved device for attenuating periodic pressure wave motion in a conduit.

Another object of this invention is to provide a new and improved device, utilizing the pressure wave interference technique, for attenuating periodic pressure wave motion in a conduit.

A further object of this invention is to provide a pressure wave interference type attenuating device tuned for cancellation of a periodic pressure wave according to a function of the elasticity of the walls of the device.

Yet another object of this invention is to provide a pressure wave interference type attenuating device wherein the physical size to which the quincke filter side-branch conduit must be tuned may be substantially reduced over prior art devices through the utilization of the relationship between the propagation rate of periodic motion in the conduit and the elasticity of the conduit walls.

Still a further object of this invention is to provide a pressure wave interference type attenuating device according to the foregoing objects wherein the construction of the device is simple, compact and immediately adapted for insertion in a power steering fluid line.

A further object of this invention is to provide a pressure wave interference type attenuating device of compact and simple coaxial tube construction immediately adapted for insertion in a power steering or other pressurized fluid line.

Still another object of this invention is to provide a pressure wave interference type attenuating device constructed of coaxial elastomeric and metal tubes, the elastomeric tube providing the supply hose from the pump of a power steering system, and the metal tube being sufficiently flexible with the elastomeric tube to accommodate whatever twisting may be necessary for installation of the device within the engine compartment of a vehicle.

These and other objects, features and advantages of the invention will be readily apparent from the following specification and drawings wherein:

FIGURE 6 is a partially broken away view of a portion of FIGURE 5;

FIGURE 7 is a view similar to FIGURE 6 of a fourth embodiment of an attenuating device according to this invention; and FIGURE 8 is a graph illustrating the operating characteristics of an attenuating device according to this invention.

Figure 1:
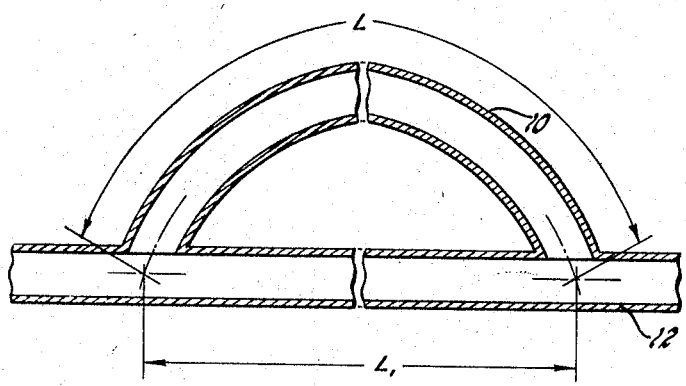
FIGURE 1 is a sectional view of one embodiment of a prior art pressure wave interference attenuating device.

Referring now particularly to FIGURE 1 of the drawings, there is illustrated the general configuration of a prior art pressure wave interference attenuating device, of the so-called quincke filter type, wherein a half wavelength phase lag side-branch tube 10 is connected to a conduit 12 for attenuation of periodic pressure wave motion transmitted through the medium contained therein. As is well-known, according to the principle of operation of this configuration of the filter, a periodic pressure wave propagating down conduit 12 will, when reaching an inlet of tube 10, divide and travel over the lengths of the tube and the traverse conduit section to blend at the outlet of the tube substantially one-half wavelength or 180° out-of-phase, ideally to result in a net pressure disturbance of zero amplitude. For example, where the inlet and outlet of tube 10 are separated by a length of traversed conduit section $L_1 = \lambda$, this cancellation is effected by tuning tube 10 to a length $$L = L_1 + \frac{\lambda}{2} = \frac{3}{2}\lambda$$

The selection of $L_1 = \lambda$ is of course purely arbitrary herein, the $\lambda/2$ phase lag length being the important criterion.

Figure 2:
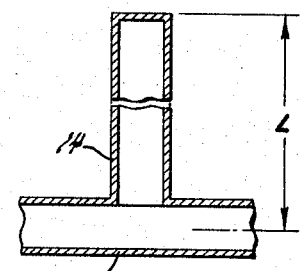
FIGURE 2 is a sectional view of another embodiment of a prior art pressure wave interference type attenuating device.

FIGURE 2 illustrates another embodiment, of the specific so-called quarter-wave side-branch tube type, wherein the pressure disturbance at the inlet of the side-branch tube 14 travels a quarter wavelength to the rigid termination at the end of the tube, reflects therefrom, and travels another quarter wavelength so as to blend with the pressure wave motion in conduit 12 one-half wavelength or 180° out-of-phase therewith. In this case, of course, tube 14 is tuned to a length $$L = \frac{\lambda}{4}$$

The wavelength $\lambda$ for a periodic wave of a given frequency $f$ and propagated with the speed of sound $c$ of the medium is, of course, determined according to the relation $$\lambda = \frac{c}{f} \tag{1}$$

The devices shown in FIGURES 1 and 2 represent two well-known specific configurations of pressure wave interference devices, others being equally practical for use. Thus, as used herein, the term pressure wave interference device will be understood to refer to that general class of acoustical attenuating device which acts in conjunction with the signal source as a distributed parameter acoustical network which operates primarily on the phase characteristic of the periodic signal and which is physically arranged to employ this phase characteristic for vector addition and cancellation of the signal. Accordingly, the term side-branch as used herein will be understood as referring to the device itself or to that element thereof which operates upon the phase characteristic in the above manner, whether in conjunction with a distinct main conduit, in conjunction with additional such side-branches, or otherwise. As is well-known, pressure wave interference devices are markedly distinguished from "lumped parameter" type devices such as Helmholtz resonators. In the pressure wave interference distributed parameter type of device, the physical length of the tuned element is large with respect to $\lambda$, and a progressive phase change is definitely observable in the wave motion over the length of the device whereas with lumped parameter devices, the physical dimensions are small in comparison with $\lambda$ and no such phase characteristic exists. Thus, the tuning of the two classes proceeds entirely differently.

The tuning of the devices shown in FIGURES 1 and 2 have in the past been determined according to classical theory on the longitudinal propagation of periodic pressure wave motion in a conduit wherein an important assumption is made, namely, that the walls of the conduit are sufficiently rigid so that transverse momentum flux effects in the medium resulting from yielding of the conduit walls may be neglected. Thus, with the diameter of the conduit sufficiently great to additionally avoid viscosity effects, the speed of sound $c$ of a longitudinally propagating plane wave through the fluid contained in the conduit is simply set equal to $V_c$, the characteristic speed of sound derived from the adiabatic properties of such fluid in an unbounded bulk state. Accordingly, when designing prior art pressure wave interference devices with the aid of Equation 1 above, steps are deliberately taken to justify this assumption by constructing the devices of very rigid material.

This invention, however, rather than seeking to avoid transverse momentum flux effects, employs these effects to great advantage in reducing the length to which an attenuating device must be tuned to a given frequency of periodic motion.

The transverse momentum flux effects, and their influence on the longitudinal propagation rate in the medium are ultimately a result of the work done on the walls of the surrounding conduit, as determined primarily according to the elasticity of the wall material. The speed of sound $c$ within a conduit fabricated of a particular material is thus directly related to this elasticity, and it has been theoretically and experimentally determined that this relation may be described as $$\frac{c}{V_c} = \frac{1}{\sqrt{1 + \frac{KD}{Et}}} \tag{2}$$

where $V_c$ is the normal or characteristic propagation rate of a spherical wave in a large unbounded bulk of the medium or of a plane wave in a conduit of infinite rigidity, where $K$ is the bulk modulus of elasticity of the medium, where $D$ is the inside diameter of the conduit, where $E$ is Young's modulus of elasticity or equivalent modulus of radial elasticity of the conduit wall material, and where $t$ is the thickness of the conduit walls. It can readily be seen that where $KD/Et$ is large compared with unity, the effect is to substantially decrease the speed of sound from that in a bulk of the liquid, or from that in a rigid conduit.

In medium grade oil, for example, having a normal speed of sound $V_c = 4370$ ft./sec., and a bulk modulus $K = 220,000$ p.s.i., a pressure wave through a steel conduit containing such oil and having a Young's modulus $E \cong 3 \times 10^7$ p.s.i. and a ratio $$\frac{D}{t} = 11.5$$

would permit propagation of the wave at about 4300 ft./ sec. However, a rubber conduit of the same dimensions but having a Young's modulus $E \cong 800$ p.s.i. would permit propagation only at about 77 ft./sec.

According to the invention, it is conclusive that, when applying these considerations to a pressure wave interference device, the physical size to which the side-branch tube must be tuned for cancellation of a given frequency of interest may be greatly reduced by proper selection of the properties of the side-branch wall material. If, for example, the tube 10 of FIGURE 1 conforms to the specifications given in the above example of a steel tube, contains medium grade oil, and is to be tuned for cancellation of a periodic pressure wave at a frequency of about 120 cycles per second, the length to which the tube would be tuned would be $$L = \frac{3}{2}\lambda = \frac{(3)(4300)}{(2)(120)} = 54 \text{ feet}$$

If, however, the tube conforms to the specifications of the rubber tube example given above, the length of the tube would be greatly reduced to $$\frac{(3)77}{(2)(120)}$$

or 0.96 feet, provided the physical connections between the tube and the main conduit could practically be made at this tube length. Such an attenuating device is shown in FIGURE 3, wherein both the main conduit and the side-branch tube 16 are made of rubber according to the example above, such that the traversed main conduit section would be of a length $L_1 = \lambda = .64$ feet and the tube 16 of a length $$L = \frac{3}{2}\lambda = .96 \text{ feet}$$

Other lengths and materials of main conduit and tube are of course practical, it only being necessary that a half wavelength phase lag be present in the tube 16 over that in any length of traversed conduit section.

Similarly, for the quater-wave side-branch tube 14 of FIGURE 2, a steel tube as above would be 9 feet long, but if made of rubber as above would be only 2 inches long, neglecting of course any adverse coupling dependencies on the ratio $D/L$ of the tube. Such an attenuating device is shown in FIGURE 4, the rubber side-branch tube 18 thereof being tuned to a quarter wavelength.

Figure 3:
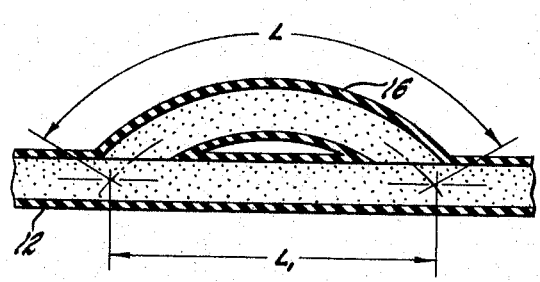
FIGURE 3 is a sectional view of one embodiment of an attenuating device according to this invention.
Figure 4:
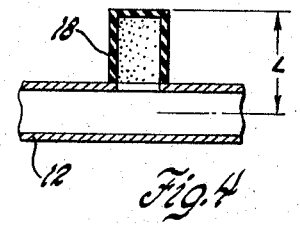
FIGURE 4 is a sectional view of a second embodiment of an attenuating device according to this invention.

Again, it will be understood that configurations of quincke filter attenuators other than those shown in FIGURES 3 and 4 are equally well-adapted for use. As a general proposition, pressure wave interference type attenuators ordinarily operate with side-branches tuned either to exactly a quarter wavelength of the frequency of interest, for a half wavelength phase lag, or odd multiples of either. In solving Equation 2 for $c$ and substituting into Equation 1 it may be generally stated that a quincke filter adhering to the principles of this invention may be tuned according to the relation $$L = \left[\frac{n}{4}, \frac{m}{2}\right] \frac{V_c}{f\sqrt{1 + \frac{KD}{Et}}} \quad (3)$$

where $n/4$ and $m/2$ are series multipliers respective to the quarter and half wave modes of side-branch operation, and where both $n$ and $m$ equal any odd integer. The term L in the case of the quincke filter such as shown in FIGURE 3 will be understood as representing only the odd multiple of half-wave phase lag path required and that this implies $L_1 = 0$. As a practical matter, $L_1$ may be a length of any real numerical value, such quantity then being added to L in Equation 3 to obtain the actual length of tube 10. The underlying principles of the invention thus being fully explained in terms of general application, the description will now proceed on a particular application of the invention to a pressure wave interference type attenuator adapted for use in a vehicle power steering system, reference being had to FIGURES 5 through 8 of the drawings.

Figure 5:
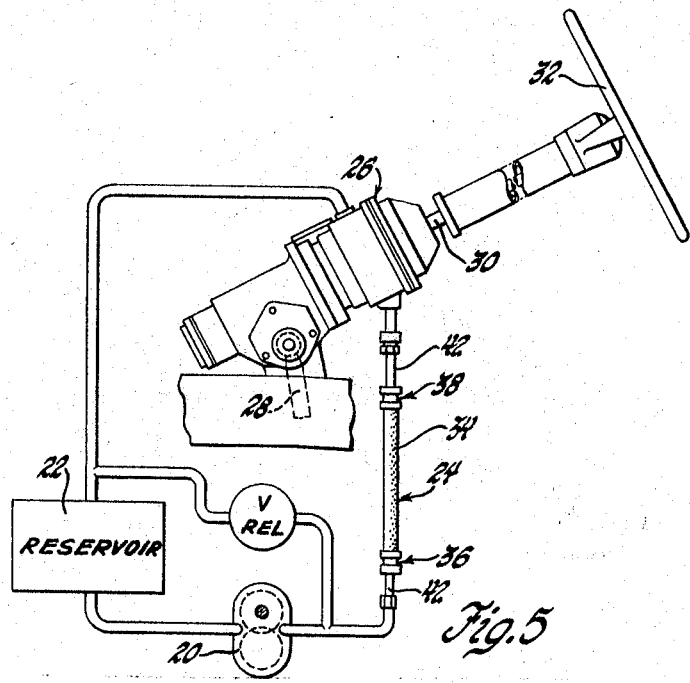
FIGURE 5 is a view showing, in partially diagrammatic form, a vehicle power steering system including a third embodiment of an attenuating device according to this invention.

In FIGURE 5 is illustrated a conventional power steering system including a pump 20 drawing oil or other fluid to be pressurized from a reservoir 22 and connecting through a supply tubing assembly 24 to the control valve portion of an integral steering gear 26. A reciprocating piston type fluid motor within gear 26 is controlled by the control valve portion thereof and the motor is operatively connected to a pitman arm indicated at 28. The pitman arm connects with suitable steering linkage tied to the dirigible wheels of the vehicle for steering the same upon operation of the fluid motor. The control valve portion of gear 26 is structurally connected to a steering shaft assembly 30 which extends from the gear 26 to within the passenger compartment of the vehicle and mounts therein a steering wheel 32. Reference may be had to U.S. Patent No. 3,022,772 for a complete description of the type of power steering system described herein. It is a characteristic of power steering systems of the above-described integral type as well as others such as the linkage booster type, that the pressure pulsations generated by the pump are communicated throughout the fluid system in sufficient strength to directly excite the steering shaft 30 and associated structure into substantial vibration or rasp. This vibration is manifested to the vehicle operator at wheel 32 and is usually most objectionable during low engine speed or engine idling conditions.

Inasmuch as the most objectionable rasp conditions occur at a more or less fixed pump speed or frequency, a pressure wave interference type attenuating device according to the principles of this invention is employed to cancel the pressure waves or pulsations from the pump. In choosing a specific configuration of the attenuator device for application in the power steering system, considerations are given not only to carrying out the general principles generally explained above, but also to minimum pressure loss, maximum compactness of the attenuator, and its ready adaptation to a fluid system pressurized to values in the order of 1000 p.s.i. or above. A coaxial tube arrangement in the supply tubing assembly 24 performs both the function of supplying pressurized fluid from the pump to gear 26, and providing an attenuator device according to this invention.

As seen best in FIGURE 6, tubing assembly 24 generally includes a reinforced rubber hose 34 provided at one end thereof with an end fitting assembly 36 for connection to the discharge of pump 20, and at the other end thereof with a fitting assembly 38 for connection to the supply port of gear 26. Each fitting assembly 36 and 38 includes an outer cylindrical body portion 40 for encircling a respective end of hose 34, and a tube 42 coaxial with the body portion and inserted within the hose. Each body portion 40 is crimped to compress the ends of hose 34 over striations on the inner ends of the tubes 42.

Secured within tube 42 of fitting assembly 36 is one end of a flexible tube 46 having an open end cap 48 on the other end thereof. Tube 46 is capable of being flexed to a desired curvature with hose 34 to accommodate any bending or twisting that may be necessary to connect tubing assembly 24 between pump 20 and gear 26. End cap 48 prevents abrasion of hose 34.

The annular cavity 50 formed intermediate hose 34 and tube 46 provides a quarter wave side-branch according to this invention and tuned to a length L. Pressure pulsations or waves originating at the pump travel through tube 42 of fitting assembly 36 and through tube 46 to exit into a fluid volume 52 within hose 34 adjacent fitting assembly 38. A wave, once exiting the tube 46 into volume 52 will of course radiate spherically therein to propagate in a downstream direction toward reflective surfaces in gear 26 or fitting assembly 38, possibly to create effects later to be discussed, and also in an upstream direction over the length of cavity 50. The upstream wave reflects off the square inner end 54 of fitting assembly 36, to again traverse the length of the cavity in a downstream direction and blend within volume 52 with the traveling wave exiting tube 46 in substantially 180° out-of-phase relation. The resultant periodic pressure disturbance is thus substantially zero and the pressure waves from the pump are effectively eliminated before reaching gear 26 and associated structure.

Referring now to FIGURE 8, wherein is shown the measured acoustical operating characteristics of the attenuator shown in FIGURE 6, it can be seen that at the rasp frequency $f_r$, attenuation as high as in the order of 20 db is realized, the phase shift mechanism utilized being clearly illustrated in the upper curve which shows a 90° phase shift at $f_r$ at points in the wave at volume 52 and at the upstream end of cavity 50. It will further be observed that similar peaks of attenuation and phase shift occur at odd multiples of $f_r$. It is thought that the fairly broad bands of attenuation centering at $f_r$ and at the odd multiples thereof arise from additional acoustical mechanisms such as additional side-branch elements created by reflections in gear 36, or such as a lumped acoustical element in volume 52, either of which could act concurrently with the main quincke filter side-branch and with the compliance element provided by hose 34. In practice, it has been found that best results are obtained when the downstream end of tube 46 at end cap 48 is spaced approximately one inch from the flange or reflecting end of tube 42 of fitting assembly 38 to form volume 52. Although the attenuator of FIGURE 6 is shown as having the capped end of tube 46 arranged at a downstream end of tubing assembly 24 from pump 20, the tubing assembly may be reversed to have the capped end of the tube at the upstream end. The operating characteristics shown in FIGURE 8, particularly the band-broadening effects discussed above, may vary slightly with variations in the size of volume 52, the cross-sectional area of cavity 50, etc. These band-broadening effects may thus react directly to lengthening or shortening of the hose under pressure changes therein, the best nominal length of hose 34 being determined in practice. Predictable variations will of course occur as the elasticity of hose 34 changes with the static pressure of the oil therein. Further, it will be apparent that in tuning cavity 50 to a length appropriate for quarter wave operation with respect to $f_r$, deviations in operation of the attenuator may occur if additional structure is interposed between the inlet of gear 26 and fitting assembly 38 causing reflections having effects on the wave phase relationships sought to be created within the tubing assembly.

These considerations notwithstanding, it is manifest that a greatly improved pressure wave interference type attenuator results from forming the side-branch of coaxial elastomeric and metal tubes, the rubber hose 34 enabling a very short side-branch or cavity 50 of length L as determined according to Equation 3 above. In experimentation, a device conforming to FIGURE 6 and using a standard fabric reinforced rubber power steering supply hose achieved attenuation of 20 db at a frequency of 140 c.p.s., while having a length L of only about 14 inches.

In FIGURE 7 is illustrated another embodiment of this invention, similar to the device of FIGURE 6, but being tuned substantially to a half wavelength of the frequency of interest or to approximately twice the length of the quarter wave device of FIGURE 6. Rather than providing a configuration wherein the incoming pressure pulsation is reflected to traverse the length of the unit twice, the incoming pulse is transmitted through an inner tube 56 which is apertured at 58 adjacent the upstream end thereof to permit communication of the pressure wave to an annular cavity 60 formed intermediate tube 56 and the hose 62. The pressure wave traveling downstream through cavity 60 must lag the wave traveling through tube 56 by substantially 180° or one-half wavelength, much in the manner of the device of FIGURE 3. Thus, the time lag $$t = \frac{L_o}{c_o} - \frac{L_i}{c_i} = \frac{1}{2f}$$

where $f$ is the frequency of interest, where L is the length of a passage between the points of path separation and subsequent joining, where $c$ is the speed of sound, and where the suscripts $i$ and $o$ denote the inner and outer passage respectively of tube 56 and cavity 60. In configurating the device into a coaxial tube arrangement, $$L_i = L_o = L$$

Thus, $$L = \frac{c_o c_i}{2f c_i - c_o}$$

Assumming, however, that $c_i \gg c_o$ where tube 56 is of substantially rigid material and hose 62 is highly elastic, this equation may be reduced to $$L = \frac{c_o}{2f}$$

with $c_o$ being determined on the properties and dimensions of the hose and medium according to Equation 2 given above. It is thus seen that this half wave or quincke type filter is substantially twice the length of the device of FIGURE 6, and follows the relation, $$L = \frac{V_c}{2f\sqrt{1 + \frac{KD}{Et}}} \quad (4)$$

It will be understood that inasmuch as the side-branch conduit of the attenuating device of this invention may be constructed of many types of elastomeric material, including those which are nonhomogeneous, the modulus E in Equations 3 and 4 above may represent either Young's modulus, or an equivalent modulus of radial elasticity as determined empirically for a conduit of a given material by dividing a unit circumferential stress resulting from unit pressure input by unit circumferential strain as measured by unit volume increase. Further, it will be apparent that Equation 2 above, representing the work done on the fluid and on a conduit of elastomeric material, does not exclusively represent the principles of operation of this invention, similar equations obtaining where the work done on the conduit is determined not only from the properties of the material, but also from the peculiarities of particular configurations of conduit. Thus, the highly radially flexible side-branch of the attenuator of this invention may be obtained, for example, by constructing the side-branch of thin metal material but axially convoluting it in such a manner as to undergo pronounced radial expansion under the force of the pressure wave motion therein.

It will also be understood that the devices shown and described herein, although specifically applied to the cancellation of power steering rasp, are equally well applied to the cancellation of many types of noise wherein it is desired to have narrow band attenuation of periodic pressure wave motion transmitted through a conduit. The embodiments of FIGURES 6 and 7, being designed specifically for direct insertion in a power steering line reflect certain advantages of special use in a power steering or similar system, and do not necessarily limit the extremes to which the principles of this invention may be carried in providing great improvements in pressure wave interference type attenuating devices.

Thus a new and improved noise attenuating device is provided.

I claim:

1. A pressure wave interference attenuating device for cancellation of periodic pressure wave motion transmitted through fluid media in a main conduit, comprising, side-branch conduit means constructed of elastomeric material and communicating with said main conduit, said conduit means being tuned to a length L according to the relation $$L = \left[\frac{n}{4}, \frac{m}{2}\right] \frac{V_c}{f\sqrt{1+\frac{KD}{Et}}}$$

where $n$ and $m$ each equal any odd integer, where $f$ is the frequency of said wave motion, where $V_c$ is the characteristic speed of sound in a bulk of said fluid, where $K$ is the bulk modulus of elasticity of said fluid, where $D$ is the diameter of said conduit means, where $t$ is the wall thickness of said conduit means, and where E is a modulus of elasticity of said material.

2. In a wave motion attenuating device for fluid transfer systems of the type including a primary conduit arranged to transfer fluid from one point to another and a secondary side branch conduit of the distributed parameter type communicating with the primary conduit and arranged to receive fluid and wave motion of a given frequency from the primary conduit and to carry the received wave motion over a length to reintroduce it to the wave motion in the primary conduit, the improvement comprising so constructing the secondary conduit as to provide the walls thereof with a high degree of radial flexibility, and so relating the flexibility characteristics of the secondary conduit walls to the given frequency of wave motion and to the wave motion transmitting property of the fluid in the system as to determine and tune the length of the secondary conduit to provide attenuation by reintroduction of the received wave motion in the secondary conduit to the primary conduit substantially one-half wavelength out-of-phase with the wave motion in the primary conduit.

3. In a wave motion attenuating device for fluid transfer systems of the type including a primary conduit arranged to transfer fluid from one point to another and a secondary side branch conduit of the distributed parameter type communicating with the primary conduit and arranged to receive fluid and wave motion of a given frequency from the primary conduit and to carry the received wave motion over a length to reintroduce it to the wave motion in the primary conduit, the improvement comprising constructing the secondary conduit of elastomeric material having a high degree of radial elasticity and so relating the elasticity of the secondary conduit walls to the given frequency of wave motion and to the wave motion transmitting property of the fluid in the system as to determine and tune the length of the secondary conduit to provide attenuation by reintroduction of the received wave motion in the secondary conduit to the primary conduit substantially one-half wavelength out-of-phase with the wave motion in the primary conduit.

4. A device for attenuating periodic pressure wave motion propagated in a fluid contained therein having a characteristic wave motion propagation rate, comprising, a main conduit portion for carrying said wave motion, and a side branch conduit portion of the distributed parameter type communicating with said main portion to receive incident wave motion therein, said side branch portion being tuned by length to carry said incident wave motion over said tuned length to reintroduce it to the wave motion in said main portion substantially one-half wavelength out-of-phase therewith, said side branch portion being constructed with highly radially flexible walls to greatly reduce the wave motion propagation rate of the fluid in said side branch portion below the characteristic rate of said fluid whereby the length of side-branch portion required for said out-of-phase reintroduction is greatly reduced over the required length of a side branch portion constructed of substantially radially inflexible walls.

5. A device for attenuating periodic pressure wave motion propagated in a fluid contained therein having a characteristic wave motion propagation rate, comprising a main conduit portion for carrying said wave motion, and a side branch conduit portion of the distributed parameter type communicating with said main portion to receive incident wave motion therein, said side branch portion being tuned by length to carry said incident wave motion over said tuned length and reintroduce it to the wave motion in said main portion substantially one-half wavelength out-of-phase therewith, said side branch portion being constructed of elastomeric material having predetermined high elasticity operative to greatly reduce the wave motion propagation rate of the fluid in said side branch portion below the characteristic rate of said fluid whereby the length of side branch portion required for said out-of-phase reintroduction is greatly reduced over the required length of a side branch portion constructed of radially inelastic material.

6. A device for attenuating periodic wave motion propagated in a fluid contained therein, comprising a main conduit portion, and a side branch conduit portion arranged coaxially with and communicating with said main portion to receive incident wave motion therein, said side branch portion being tuned by length to carry said incident wave motion over said tuned length and reintroduce it to the wave motion in said main portion substantially one-half wavelength out-of-phase therewith, said side branch portion being constructed with highly radially flexible walls to control the propagation rate and wavelength of the wave motion in said side branch portion, the length of said side branch portion being tuned for said out-of-phase reintroduction in accordance with the wavelength controlling effects of the radial flexibility of the walls of said side branch portion.

7. A device for attenuating periodic pressure wave motion propagated in a fluid contained therein, comprising, a main conduit portion for carrying said wave motion, and a quarter-wave tube side branch portion communicating with said main portion to receive incident wave motion therein and to reflect said received wave motion back to said main conduit substantially one-half wavelength out-of-phase with the wave motion therein, said side branch portion being constructed of elastomeric material having predetermined high elasticity operative to control the propagation rate and wavelength of the wave motion in said side branch portion, the length of said side branch portion being tuned to a quarter wavelength of the wave motion therein in accordance with the wavelength controlling effects of the elasticity of said elastomeric material.

8. A device for attenuating periodic wave motion propagated in a fluid contained therein, comprising, an inner main conduit portion constructed of rigid material and an outer quarter-wave side branch conduit portion arranged coaxially with said main portion, said portions defining therebetween a quarter-wave side branch cavity open at one end to said main portion and closed at the opposite end by a reflective termination, said side branch cavity being tuned by length to carry incident wave motion entering said one end from said main portion over said tuned length to reflect from said termination and recombine with the wave motion in said main portion substantially one-half wavelength out-of-phase therewith, said outer side branch portion being constructed of elastomeric material having predetermined high elasticity operative to control the propagation rate and wavelength of the wave motion in said side branch cavity, the length of said side branch cavity being tuned to a quarter wavelength of the wave motion in said cavity in accordance with the wavelength controlling effects of the elasticity of said elastomeric material.

9. Supply conduit and attenuator means for a vehicle power steering system having a source of fluid, a pump and a fluid motor, comprising, hose means constructed of elastomeric material having a predetermined high degree of elasticity, a tubular metallic member arranged coaxially within said hose means, fitting means adapted to connect one end of said hose means to said pump and the other end of said hose means to said motor to pass fluid under pressure between said pump and said motor through said hose means, said hose means and said tubular member defining therebetween an elongated annular cavity providing an attenuator side branch of the distributed parameter type adapted to receive incident wave motion of a given frequency from said pump and to carry the received wave motion over a tuned length of the annular cavity to reintroduce it to the incident wave motion from said pump, the elasticity characteristics of said hose means being so related to the given frequency of wave motion and to the wave motion transmitting property of said fluid as to determine and tune the length of said annular cavity to provide attenuation by reintroduction of the received wave motion in said annular cavity to said incident wave motion from said pump substantially one-half wavelength out-of-phase therewith.

10. Supply conduit and attenuator means as recited in claim 9 wherein said cavity is tuned according to said relationship to a length substantially equalling a quarter wavelength of the wave motion in said cavity, and wherein one end of said cavity is closed to communication between said hose means and said tubular member and is provided with a reflective termination.

11. Supply conduit and attenuator means as recited in claim 9 wherein said cavity is tuned according to said relationship to a length substantially equalling a half wavelength of the wave motion in said cavity, wherein one end of said cavity is open to communication between said hose means and said tubular member, and wherein said tubular member is apertured in the wall thereof adjacent the other end of said cavity.

12. Supply conduit and attenuator means for a vehicle power steering system having a source of fluid, a pump, and a fluid motor, comprising, a hose member constructed of elastomeric material having a predetermined high degree of elasticity, a tubular metallic member arranged coaxially within said hose member, first fitting means secured to one end of said hose member and providing a fluid path connection to one end of said tubular member closed from communication with said one end of said hose member, second fitting means secured to the other end of said hose member and communicating therewith, means for connecting one of said fitting means to said pump and for connecting the other of said fitting means to said motor for passing fluid under pressure between said pump and said motor, said hose member and said tubular member defining therebetween an elongated annular cavity providing an attenuator side branch of the quarter-wave distributed parameter type adapted to receive incident wave motion of a given frequency from said pump and to carry the received wave motion over a tuned length of the annular cavity to reintroduce it to the incident wave motion in said pump, the elasticity characteristics of the hose member being so related to the given frequency of wave motion and to the wave motion transmitting property of said fluid as to determine and tune the length of said annular cavity to provide attenuation by reintroduction of the received wave motion in said annular cavity to the incident wave motion from said pump substantially one-half wavelength out-of-phase therewith, said first fitting means including a portion providing a reflective termination at one end of said cavity, the other end of said tubular member at the other end of said cavity being spaced from said second fitting means, said hose member and said tubular member being bodily flexible as a unit so as to be installed in desired curvature between said pump and said motor.

References Cited
UNITED STATES PATENTS

| | | | |
|---|---|---|---|
| 2,027,359 | 1/1936 | Wood et al. | 181—59 X |
| 2,185,023 | 12/1939 | Crane | 181—48 X |
| 2,297,046 | 9/1942 | Bourne | 181—48 |
| 2,684,692 | 7/1954 | Hunter et al. | 60—52 X |
| 3,134,611 | 5/1964 | Iversen | 60—52 X |

EDGAR W. GEOGHEGAN, *Primary Examiner.*